United States Patent [19]

Otto

[11] Patent Number: 4,846,285

[45] Date of Patent: Jul. 11, 1989

[54] AIR WRENCH

[75] Inventor: Günter Otto, Iltisstrasse 90 b, D-4432 Gronau, Fed. Rep. of Germany

[73] Assignees: Günter Otto, Gronau; Johannes Lübbering; Christian Reckendrees, both of Herzebrock-Clarholz, all of Fed. Rep. of Germany

[21] Appl. No.: 119,806

[22] Filed: Nov. 12, 1987

[30] Foreign Application Priority Data

Nov. 15, 1986 [DE] Fed. Rep. of Germany ....... 3639098

[51] Int. Cl.$^4$ .............................................. B23Q 5/00
[52] U.S. Cl. ........................................ 173/12; 81/467
[58] Field of Search ...................... 173/12, 20; 81/467

[56] References Cited

U.S. PATENT DOCUMENTS

| 2,130,111 | 9/1938 | Whitney et al. | 81/463 |
| 3,827,506 | 8/1974 | Himmelstein et al. | 173/12 |
| 4,006,784 | 2/1977 | Dudek | 173/12 |
| 4,244,434 | 1/1981 | Wilson | 81/467 |

Primary Examiner—Frank T. Yost
Assistant Examiner—William Fridie, Jr.
Attorney, Agent, or Firm—Felfe & Lynch

[57] ABSTRACT

An air wrench, with a compressed air motor, a wrench head and a gearing for transferring the power of the motor to the head, as well as a control mechanism, which comprises at least one adjustable pressure reducer for limiting the torque and which permits the wrench to be switched on and off manually by opening and closing a main air valve in the compressed air line to the motor of the wrench. The control mechanism has a triggering device which, as the pressure in the compressed air line to the motor of the wrench rises from the dynamic pressure while the compressed air motor is running to the static pressure while the motor is braked or obstructed as a result of having reached a particular torque, for example, when tightening a bolt, stops the supply of compressed air to the motor of the wrench, 7 Claims, 1 Drawing Sheet

AIR WRENCH

The invention relates to an air wrench, with a compressed air motor, a wrench head and a gearing for transferring the power of the motor to the head, as well as a control mechanism, which comprises at least one adjustable pressure reducer for limiting the torque and which permits the wrench to be switched on and off manually by opening and closing a main air valve in the compressed air line to the motor of the wrench.

Air wrenches of the aforementioned type are generally known and are frequently used, for example, in motor vehicle construction and the motor vehicle trade. For many applications of such wrenches, it is important to exert a definite, specifiable torque, for example, when tightening bolts. Known wrenches are equipped for this purpose with the aforementioned pressure reducers in the air line and/or with an adjustable friction slip clutch between motor and wrench head, which work strictly mechanically. At the conclusion of a screwing process, the wrench is switched on and also off manually by the person using or operating the wrench. At the end of each screwing process, this person must intercept the torque produced by the wrench with hands and arms and especially in the case of relatively high-speed wrenches, the hand and arm joints are subjected to high stresses, so that, in the long run, there may be injury to health. So as not to have to counterhold the torque longer than necessary, a high concentration and a quick reaction on the part of the operator are required. However, it is difficult to keep this up with work that is monotonous and takes a long time. As a result, it may happen that the wrench is switched off too early unintentionally or also deliberately to avoid excessive jolting motions. In the long run, this leads to an excessive inaccuracy and scatter of the tightening torques of, for example, a number of bolted connections, which should all be the same. Even if the operator does excellent work, relatively large errors arise in tightening torques of different bolting processes with unchanged settings of the wrench. These errors are based on the fact that a strictly mechanical friction slip clutch, in principle, cannot operate accurately and exactly reproducibly. Setting the torque by the pressure reducer also has disadvantages, since the rotational speed, at which the wrench operates, is also changed and, under some circumstances, becomes too high or too low. With this, the moments of inertia of the rotating parts of the wrench are also changed every time the pressure setting is changed. This makes it impossible to specify and adhere to precise torques or tightening torques.

It is, therefore, an object of the invention to provide an air wrench of the initially named type, which avoids the disadvantages listed and which especially permits the desired torques or tightening torques to be specified and adhered to precisely and reproducibly and which effectively lessens the burden on the operator.

This objective is accomplished pursuant to the invention by an air wrench of the initially named type, in which the control mechanism has a triggering device, which, as the pressure in the compressed air line to the motor of the wrench rises from the dynamic pressure while the compressed air motor is running to the static pressure while the motor is braked or obstructed as a result of having reached a particular torque, for example, when tightening a bolt, stops the supply of compressed air to the motor of the wrench.

This air wrench offers the advantage that the operator need no longer switch off the motor manually. Instead, the phenomenon of the pressure increase from the dynamic to the static pressure at the end of the bolting process is utilized to switch off the motor. By these means, the switching off is conducted in the same way for each bolting process and especially when the same turning or tightening torque is attained. Because of the control mechanism described, good reproducibility of a specifiable turning or tightening torque can already be attained with the wrench, merely adjusting the pressure reducer.

A further improvement in the adjustability and reproducibility of the turning and tightening torque of the wrench is achieved if the triggering device has a pressure sensor with an adjustable response threshold. Moreover, this refinement of the invention has the advantage that the pressure reducer no longer is required to set the torque. Instead, an adjustment can be made so that the wrench always operates at an optimum rotational speed. The rotational speed thus remains completely unaffected by the torque setting. Only at its maximum possible value is the torque affected by the pressure reducer. However, this is not a disadvantage in practice, but rather, on the contrary, represents a safety factor.

Furthermore, provisions are made in the air wrench of the invention to insert an intermediate link of limited elasticity into the power transmission from the compressed air motor to the wrench head. This intermediate link contributes further to reducing the burden on the operator of the wrench by seeing to it that the torque is not built up abruptly or suddenly as a bolt is tightened, but rather comparatively slowly and steadily, starting from a low value and then increasingly. According to preliminary practical experiments, the stresses on the joints of the operator are reduced by up to 50% by these means. This represents a significant improvement in the working conditions of the operator and in the manageability of the wrench.

A preferred embodiment of the invention sees to it that the intermediate link of limited elasticity consists of two coupling elements, namely, on the one hand, of a curved crown and, on the other of a counterpart, which can slide or roll coaxially by a limited angular amount on the crown with mutual axial displacement. The crown and counterpart are pressed together by the force of a spring. One of the coupling elements is linked nonpositively with the output side of the motor or the gearing and the other of the coupling elements with the input side of the gearing or the wrench head. An intermediate link of such a construction is very sturdy and durable and, even when used roughly, is subject to significantly less wear than, for example, an elastic rubber element. Moreover, the characteristics of the intermediate link can be varied here by varying the power of the spring and optimized for the particular application of the wrench. A portion of the otherwise occurring sudden rotational movements of the wrench as a whole about a bolt that is being tightened is converted by the intermediate link into a completely harmless axial motion in the direction of the longitudinal axis of the bolt. Finally, the intermediate link can easily be constructed in such a manner, that it can be used without changes for clockwise as well as counterclockwise rotation.

Depending on the intended field of use of the wrench, the control mechanism can be constructed with elements, which operate entirely pneumatically or also with electropneumatic elements. The first possibility offers the advantage of complete independence of an electric power supply and complete safety from the formation of electric sparks. The second possibility offers especially the advantage that it can be realized very inexpensively.

Depending on the basic type of the control mechanism of the wrench, provisions are made so that the pressure sensor is a pneumatic reversing valve, downstream from which an air valve, which can be actuated pneumatically by this reversing valve, is connected in the line supplying compressed air to the motor of the wrench or that the pressure sensor is an electropneumatic reversing valve, downstream from which an air valve, which can be actuated electromagnetically by this reversing valve, is connected in the line supplying compressed air to the motor of the wrench. Both versions of the wrench offer the advantage of a high operational safety. At the same time, they enable the turning and tightening torque to be adjusted accurately and easily.

In accordance with the invention, an air wrench comprises a compressed air motor and a wrench head and a gearing for transferring the power of the motor to the head. The wrench also includes a control mechanism, which comprises at least one adjustable pressure reducer for limiting the torque and which includes a main air valve in a compressed air line to the motor of the wrench and which permits the wrench to be switched on and off manually by opening and closing the main air valve, wherein the control mechanism includes a triggering device which, as the pressure in the compressed air line to the motor of the wrench rises from the dynamic pressure while the compressed air motor is running to the static pressure while the motor is braked or obstructed as a result of having reached a particular torque, stops the supply of compressed air to the motor of the wrench.

For a better understanding of the invention, together with other and further objects thereof, reference is made to the following description, taken in connection with the accompanying drawings, and its scope will be pointed out in the appended claims.

Referring now to the drawing.

Figure 1:
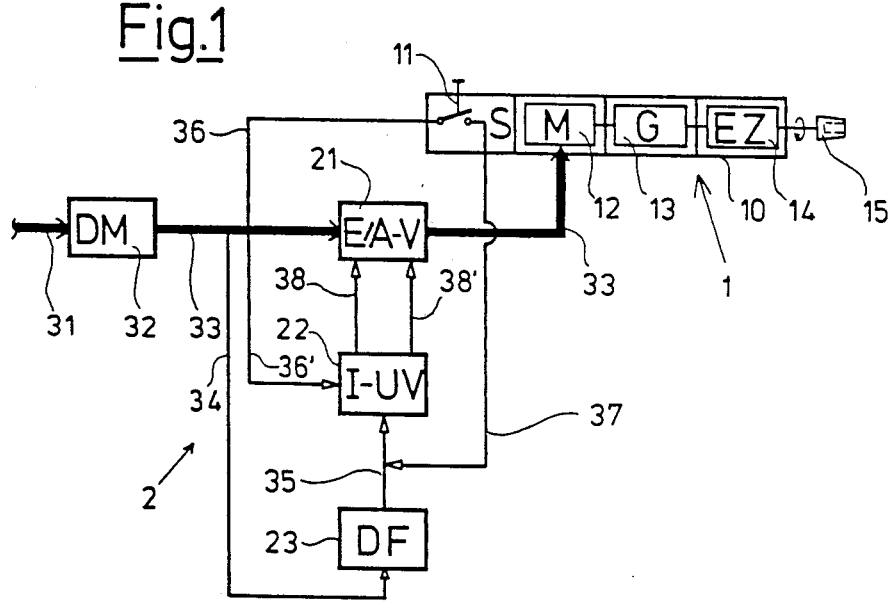
FIG. 1 is a schematic representation of an air wrench of the invention with a control mechanism.

Referring now more particularly to FIG. 1, there is represented schematically an example of an air wrench 1 together with the associated control mechanism 2. In the interior of a housing 10, the wrench 1 has the usual components such as a motor 12, a gearing 13, as well as a wrench head 15, which projects from the housing at the front. Compressed air is supplied to the motor 12 over an air line 33, which comes from a pressure reducer 32. The pressure reducer 32, in turn, is connected by way of a compressed air line 31 to a compressed air supplying facility, which is not shown. An on-off valve 21 is connected in the air line 33 from the pressure reducer 32 to the compressed air motor 12. This valve 21 either blocks or releases the supply of compressed air to the motor 12. In the example of the operation shown, the on-off valve 21 is strictly a pneumatic element, that is, the valve is opened and closed by the action of pressure on one of two switching inlets. These switching inlets of valve 21 are connected over air lines 38 and 38' with a pulse reversing valve 22 or, to be more precise, with the two outlets of this valve. Aside from these two outlets, valve 22 has a compressed air inlet, which is connected over compressed air line 36' with the main air line 33, when viewed in the direction of flow of the air, upstream from the on-off valve 21. The compressed air inlet of valve 22 thus is constantly under pressure. Finally, the pulse reversing valve 22 also has a pulse inlet. When a compressed air pulse is delivered to this inlet, the compressed air, that reached valve 22 through line 36', is switched alternately to one of the two outlets and, with that, to one of the two lines 38 or 38'. Moreover, the pulse reversing valve is self-locking, so that the switching state, once set, is maintained as long as no further compressed air pulses reach the inlet of the pulse reversing valve 22.

Compressed air pulses can reach the pulse reversing valve 22 in two different ways. The first way leads from the main air line 33 over a branch line 36, a keying valve 11 and a further air line 37 to the pulse inlet of the reversing valve 22. On activating the keying valve 11, for example, by briefly pressing it with a finger, a compressed air pulse is delivered to the pulse inlet of the reversing valve 22. In response to this, the switching state of the reversing valve 22 is reversed. By these means, the line of lines 38 and 38' to the on-off valve 21, which was previously under pressure, becomes pressureless and the reverse, that is, the on-off valve 21 also changes its switching state. This means that, by briefly activating the keying valve 11, the wrench can be switched on or off. In the example of the operation shown, the keying valve 11 is integrated in the housing 10 of the wrench 1, so that a very comfortable utility of operation is achieved. Moreover, such a keying valve 11 can be constructed significantly smaller and lighter than an on-off switch for the main air line, so that the wrench 1 as a whole becomes lighter and smaller.

The second way for compressed air pulses to the pulse inlet of the reversing valve 22 is formed by air line 35, which connects a pressure sensor 23 with the reversing valve 22. On the inlet side, the pressure sensor 23 is connected over an air line 34 with the main air line 33 between the on-off valve 21 and the pressure reducer 32. The pressure sensor 23 is so designed that, as the pressure rises in the main air line 33 from the dynamic pressure with the compressed air motor 12 running to the static pressure with motor 12 braked or obstructed, it gives a single compressed air pulse over its outlet to the air line 35. Such a pressure sensor 23 is preferably constructed as a reversing valve, which is known. Thus, by means of the pressure sensor 23, the motor 12 of the wrench 1 is switched off automatically at the end of the bolting process, since, as described above, the compressed air pulse delivered to the air line 35 brings about change-over in the pulse reversing valve 22 and thus a change in the switching state of the on-off valve 21. After transferring the wrench 1 to a new bolt, which has not yet been screwed in, the wrench can be put into operation once again by means of a brief activation of the keying valve 11.

Figure 2:
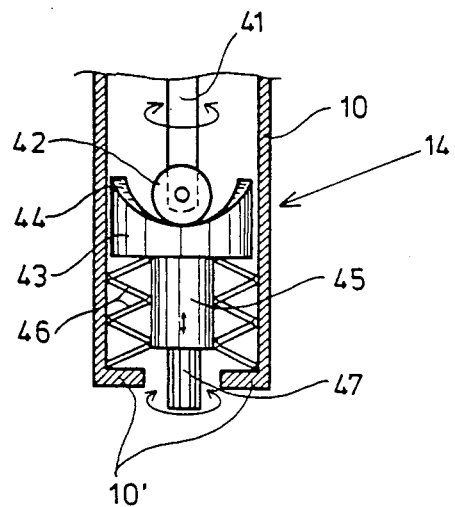
FIG. 2 is a diagrammatic view of an elastic intermediate link as part of the wrench of the invention in longitudinal section, partly in elevation.

The response threshold of the pressure sensor 23 preferably is adjustable. The possibility is thus provided of specifying and adhering to precise turning and tightening torques. Since the pressure difference between the dynamic pressure and the static pressure in the main air line 33 is of the order of about 1 bar in practice, a sufficiently large margin is available for setting different response thresholds. A further characteristic of the wrench 1 is an elastic intermediate link 14, disposed between the gearing 13 and the wrench head 15. A preferred example of the operation of this intermediate link 14 is shown in detail in FIG. 2. This Fig. shows the elastic intermediate link 14 in side view in the interior of the housing 10 of the wrench, cut open in its longitudinal direction. In the upper part of FIG. 2, a gearing drive shaft 41 is represented, which can rotate counterclockwise as well as clockwise. At the free end of the shaft 41, a pair of rollers 42 is represented, the axis of rotation of which is exactly perpendicular to the axis of rotation of shaft 41. The pair of rollers 42 (because of the representation chosen, only the front roller facing the viewer of FIG. 2 is visible) rolls on the curved crown 43, or more precisely on a runway or guideway 44 of the curved crown 43. In its further course, the curved crown 43 has a shaft 45 with a smaller diameter as well as a serrated connecting end 47 for a wrench head or a bolt nut. Within the housing 10, the shaft 41 as well as the curved crown 43 are rotatably supported. At its lower end, the housing 10 has a contraction 10', which forms a bearing surface for a stack of disk springs 46. The other bearing surface for the stack of disk springs is formed by the underside of the curved crown 43. Due to the force of the disk springs 46, the curved crown, which is axially displaceable in the direction of its axis of rotation is pressed against the pair of rollers 42 at shaft 41. The strength of the disk springs 46 as well as the freedom of movement of the curved crown 43 in the axial direction are so dimensioned, that the shaft 41 and the curved crown 43 can be rotated relative to one another about a limited angle. Because of the configuration of the runway or guideway 44 of the curved crown 43, the shaft 41, when a wrench head connected to the connecting piece 47 is braked or obstructed, at first continues to turn without axial displacement, until the maximum relative twist angle between the shaft 41 or the roller pair 42 positioned thereon and the curved crown 43 is reached. Since parallel to this the stack of disk springs 46 is compressed more strongly by the axial displacement of the curved crown 43, a higher contacting pressure results between the roller pair 42 and the curved crown 43. This elastic intermediate link 14 thus makes it possible that the torque produced as a bolt is being tightened does not set in suddenly, but is built up comparatively slowly.

Because of its symmetrical configuration, the curved crown 43 can be used in the same way for clockwise and counterclockwise rotations, as indicated by the arrows.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An air wrench comprising:
   a compressed air motor;
   a wrench head and a gearing for transferring the power of the motor to the head; and
   a control mechanism, which comprises at least one adjustable pressure reducer for limiting the torque and which includes a main air valve in a compressed air line to the motor of the wrench and which permits the wrench to be switched on and off manually by opening and closing the main air valve, wherein the control mechanism includes a triggering device which, as the pressure in the compressed air line to the motor of the wrench rises to a static pressure while the motor is braked or obstructed as a result of having reached a particular torque, stops the supply of compressed air to the motor of the wrench and which control mechanism includes an intermediate link of limited elasticity between the power transmission from the compressed air motor to the wrench head and wherein the intermediate link of limited elasticity comprises two coupling elements, one coupling element including a curved crown and the other coupling element including a counterpart which can slide or roll coaxially by a limited angular amount on the crown with mutual relative axial displacement, a spring pressing the coupling elements together by the force of the spring, one of the coupling elements being connected nonpositively with the output of one of the motor and the gearing and the other of the coupling elements with the input of the wrench head.

2. The air wrench of claim 1, which includes a pressure sensor with an adjustable response threshold and in which the pressure sensor is a pneumatic reversing valve and which includes downstream from the pressure sensor an air valve which is connected in a line supplying compressed air to the motor of the wrench and which can be actuated by the reversing valve.

3. The air wrench of claim 2, which includes a self-locking reversing valve connected between the reversing valve and the air valve.

4. The air wrench of claim 3, in which the self-locking reversing valve has a pulse inlet and which includes on the wrench a manually operable keying valve having an inlet connected with a source of compressed air at essentially a constant pressure and having an outlet connected with the pulse inlet of the self-locking valve.

5. The air wrench of claim 1, which includes a pressure sensor with an adjustable response threshold and in which the pressure sensor is an electropneumatic reversing valve, and which includes an air valve downstream of the reversing valve and which air valve can be operated electromagnetically by the reversing valve and which air valve is connected in a line supplying compressed air to the motor of the wrench.

6. The air wrench of claim 5, which includes a self-locking voltage pulse reversing relay connected between the reversing valve and the air valve.

7. The air wrench of claim 5, which includes at the wrench a manually operable keying switch, by means of which the reversing relay can be reversed and, with that, the motor of the wrench can be switched on and off.

* * * * *